(12) United States Patent  (10) Patent No.: US 9,178,698 B1
Jarjur et al.  (45) Date of Patent: Nov. 3, 2015

(54) DYNAMIC KEY MANAGEMENT

(71) Applicant: Google Inc., Mountain View, CA (US)

(72) Inventors: Omar S. Jarjur, Bothell, WA (US); Evan K. Anderson, Seattle, WA (US)

(73) Assignee: Google Inc., Mountain View, CA (US)

( * ) Notice: Subject to any disclaimer, the term of this patent is extended or adjusted under 35 U.S.C. 154(b) by 20 days.

(21) Appl. No.: 13/725,071

(22) Filed: Dec. 21, 2012

Related U.S. Application Data

(60) Provisional application No. 61/578,824, filed on Dec. 21, 2011.

(51) Int. Cl.
*H04L 9/08* (2006.01)
*G06F 21/53* (2013.01)

(52) U.S. Cl.
CPC .............. *H04L 9/0861* (2013.01); *H04L 9/08* (2013.01); *G06F 21/53* (2013.01)

(58) Field of Classification Search
CPC ................................. H04L 9/08; G06F 21/53
USPC ......................................................... 713/168
See application file for complete search history.

(56) References Cited

U.S. PATENT DOCUMENTS

| | | | |
|---|---|---|---|
| 6,598,179 B1 | 7/2003 | Chirashnya et al. | |
| 7,062,718 B2 | 6/2006 | Kodosky et al. | |
| 7,117,243 B2 | 10/2006 | Peart | |
| 7,650,331 B1 | 1/2010 | Dean et al. | |
| 7,653,833 B1 | 1/2010 | Miller et al. | |
| 7,761,573 B2 | 7/2010 | Travostino et al. | |
| 7,804,862 B1 | 9/2010 | Olson et al. | |
| 8,254,579 B1 * | 8/2012 | Morgan et al. | 380/278 |
| 2004/0139368 A1 | 7/2004 | Austen et al. | |
| 2007/0199058 A1 | 8/2007 | Baumgart et al. | |
| 2007/0271604 A1 | 11/2007 | Webster et al. | |
| 2007/0280243 A1 | 12/2007 | Wray et al. | |
| 2008/0086515 A1 | 4/2008 | Bai et al. | |
| 2008/0205415 A1 | 8/2008 | Morales | |
| 2009/0097657 A1 | 4/2009 | Schiedt et al. | |
| 2009/0199177 A1 | 8/2009 | Edwards et al. | |
| 2009/0222815 A1 | 9/2009 | Dake | |
| 2009/0241108 A1 | 9/2009 | Edwards et al. | |

(Continued)

OTHER PUBLICATIONS

Moller, Jan, et al., "Internal Network Security", Feb. 1, 2000-May 18, 2001, Retrieved from the Internet: <URL: http://www.daimi.au.dk/~fwiffo/thesis/>, 183 pages.

(Continued)

*Primary Examiner* — Dede Zecher
*Assistant Examiner* — Jason C Chiang
(74) *Attorney, Agent, or Firm* — Fish & Richardson P.C.

(57) ABSTRACT

Methods, systems, and apparatus, including computer programs, for managing keys for virtual machines (VM). One method includes receiving a first public key associated with a first user from a first client machine (CM), receiving a second public key associated with a second user from a second CM, and updating metadata associated with a project that includes a first VM and a second VM to include the first and the second public keys. The first public key and a corresponding first private key were generated on the first CM in response to a determination that the first CM lacked a private key for communication with the first VM by the first user. The second public key and a corresponding second private key were generated on the second CM in response to a determination that the second CM lacked a private key for communication with the second VM by the second user.

22 Claims, 5 Drawing Sheets

(56) References Cited

U.S. PATENT DOCUMENTS

| | | | |
|---|---|---|---|
| 2009/0249440 | A1 | 10/2009 | Platt et al. |
| 2009/0300605 | A1 | 12/2009 | Edwards et al. |
| 2010/0071035 | A1 | 3/2010 | Budko et al. |
| 2010/0199089 | A1 | 8/2010 | Vysogorets et al. |
| 2011/0022812 | A1 | 1/2011 | van der Linden et al. |
| 2011/0055361 | A1 | 3/2011 | DeHaan |
| 2011/0153838 | A1 | 6/2011 | Belkine et al. |
| 2011/0179412 | A1* | 7/2011 | Nakae et al. ............... 718/1 |
| 2011/0231280 | A1 | 9/2011 | Farah |
| 2011/0258441 | A1* | 10/2011 | Ashok et al. ............ 713/168 |
| 2011/0302415 | A1* | 12/2011 | Ahmad et al. ........... 713/168 |
| 2012/0011578 | A1* | 1/2012 | Hinton et al. ............... 726/8 |
| 2012/0137117 | A1* | 5/2012 | Bosch et al. ............... 713/2 |
| 2012/0185688 | A1 | 7/2012 | Thornton |
| 2012/0191912 | A1 | 7/2012 | Kadatch et al. |
| 2013/0073854 | A1* | 3/2013 | Patti et al. ................ 713/171 |
| 2013/0097420 | A1* | 4/2013 | Zaverucha ............... 713/156 |

OTHER PUBLICATIONS

Primet, Pascale, et al.., "HIPCAL: State of the Art of OS and Network virtualization solutions for Grids", Sep. 14, 2007, 38 pages.

Wikipedia, "IPSec", [online] [retrieved on Jan. 4, 2011]. Retrieved from the Internet: <URL: http://en.wikipedia.org/wiki/IPsec/>, 8 pages.

Abdull, AlastairIrvine, et al. "Generic Routing Encapsulation", [online] [retrieved on Jan. 4, 2011]. Retrieved from the Internet: <URL: http://creativecommons.org/licenses/by-sa/3.0/>, 5 pages.

Farinacci et al., "RFC 2784: Generic Routing Encapsulation (GRE)", Mar. 2000, The Internet Society, 10 pages.

Kent et al., "RFC 4301: Security Architecture for the Internet Protocol", Dec. 2005, The Internet Society, 102 pages.

Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key.html>, 1 page.

Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.

Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.

Wikipedia. "OAuth." [online] [Retrieved on Jan. 20, 2011]. Retrieved from the Internet <URL: http://en.wikipedia.org/wiki/OAuth>, 3 pages.

Gowalla. "API Documentation—Oauth." [Retrieved on Apr. 26, 2011]. Retrieved from the Internet <URL: http://gowalla.com/api/docs/oauth>, 4 pages.

Apache HTTP Server Version 2.0. "Log Files." [Retrieved on Feb. 15, 2011]. Retrieved from the Internet <URL: http://httpd.apache.org/docs/2.0/logs.html>, 7 pages.

Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.

MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.

Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.

Wikipedia., Anycast [Retrieved on Oct. 10, 2011] Retrieved from the Internet: URL<http://en.wikipedia.org/wiki/Anycast>, 5 pages.

VMCI Overview [Retrieved on Jun. 8, 2011] Retrieved from the Internet: <URL: http://pubs.vmware.com/vmci-sdk/VMCI_intro.html>, 3 pages.

VMware vSphere [Retrieved on Jun. 8, 2011] Retrieved from the Internet: <URL: http://www.vmware.com/products/vmotion/overview.html>, 2 pages.

Travostino, Franco, et al., Seamless Live Migration of Virtual Machines over the MAN/WAN, 2006, Elsevier Future Generation Computer Systems 2006, 10 pages.

VMCI Datagram API [Retrieved on Jun. 8, 2011], Retrieved from the Internet: <URL: http://pubs.vmware.com/vmci-sdk/datagram.html>, 1 page.

VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.

VMCIDs_Lookup [Retrieved on Jun. 8, 2011], Retrieved from the Internet: <URL: http://pubs.vmware.com/vmci-sdk/functions/VMCIDs_Lookup.html>, 2 pages.

Chen, Per M., et al., : "Maximizing Performance in a Striped Disk Array", 17th Annual International Symposium on Computer Architecture (SIGARCH 1990), 18 pages.

Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.

Vazhkudai, Sudharshan S., et al.; "Constructing Collaborative Desktop Storage Caches for Large Scientific Datasets"; ACM Journal Name, vol. V, No. N, Jun. 2006, 34 pages.

OMG, Deployment and Configuration of Component-based Distributed Applications Specification—Version 4.0, OMG, 2006, pp. 1-160.

Cala et al., "Automatic Software Deployment in the Azure Cloud", IFIP International Federation for Information Processing, 2010, pp. 1-14.

RSA Laboratories, "PKCS #11 v2.20: Cryptographic Token Interface Standard," Jun. 28, 2004, RSA Security Inc. (407 pages).

Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.

How to: Getting Started With Amazon EC2, Paul Stamatiou, Apr. 5, 2008. Retrieved from the Internet: <URL:http//paulstamatiou.com/how-to-getting-started-with-amazon-ec2>, 25 pages.

\* cited by examiner

DYNAMIC KEY MANAGEMENT

CROSS REFERENCE TO RELATED APPLICATIONS

This application is a non-provisional of and claims priority to U.S. Provisional Patent Application No. 61/578,824, filed on Dec. 21, 2011, the entire contents of which are hereby incorporated by reference.

BACKGROUND

This document relates to managing keys for virtual machines.

Cloud computing is network-based computing in which typically large collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Some cloud computing services allow end users to execute software applications in virtual machines.

SUMMARY

This document describes methods and systems for managing keys for virtual machines.

In general, one innovative aspect of the subject matter described in this specification can be embodied in methods that include the actions of receiving a first public key associated with a first user from a first client machine, receiving a second public key associated with a second user from a second client machine, and updating metadata that is (i) stored in metadata servers and (ii) associated with a project that includes a first virtual machine and a second virtual machine to include the first public key and second public key. The first public key and a corresponding first private key were generated on the first client machine in response to a determination that the first client machine lacked a private key for communication with the first virtual machine by the first user. The second public key and a corresponding second private key were generated on the second client machine in response to a determination that the second machine lacked a private key for communication with the second virtual machine by the second user. The first user and the second user are associated with the project. The metadata servers include a first metadata server and a second metadata server. The first metadata server is configured to provide the updated metadata to the first virtual machine in response to a request for updated metadata from the first virtual machine. The second metadata server is configured to provide the updated metadata to the second virtual machine in response to a request for updated metadata from the second virtual machine.

These and other aspects can optionally include one or more of the following features.

The methods can also include providing the updated metadata that includes the first public key and the second public key to the first virtual machine so that the first virtual machine can use the first public key to exchange data with or establish a connection to the first client machine while the first client machine is operable by the first user.

The methods can also include providing the updated metadata that includes the first public key and the second public key to the second virtual machine so that the second virtual machine can use the second public key to exchange data with or establish a connection to the second client machine while the second client machine is operable by the second user.

The methods can also include receiving a third public key associated with the first user from the second client machine, updating the metadata that is (i) stored in the plurality of metadata servers and (ii) associated with the project to include the third public key, and providing the updated metadata that includes the third public key to the second virtual machine so that the second virtual machine can use the third public key to exchange data with or establish a connection to the second client machine while the second client machine is operable by the first user. The third public key and a corresponding third private key were generated on the second client machine in response to a determination that the second client machine lacked a private key for communication with the second virtual machine by the first user.

The first public key and the corresponding first private key are associated with a first secure shell key.

The requests for updated metadata include periodic requests for updated metadata.

The first metadata server is configured to provide updated metadata to only the first virtual machine and the second metadata server is configured to provide updated metadata to only the second virtual machine.

The project is associated with a billable entity and the first and second users are associated with the billable entity.

The first virtual machine and the second virtual machine are hosted on one or more physical machines different than a physical machine performing the computer-implemented method.

Particular aspects of the subject matter described below can be implemented to realize one or more of the following advantages. For example, accessibility of virtual machines can be increased because users of virtual machines can use various client machines to establish connections to or exchange data with the virtual machines without manually managing keys associated with the virtual machines. In addition, managing keys associated with virtual machines can be simplified and automated. For example, the client machine can automatically generate a key and the virtual machines can automatically be updated to include the keys. This can reduce the need to manually manipulate and/or copy keys from client machines.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Systems and methods are described for managing keys for virtual machines. A user attempts to exchange data with or establish a connection to a virtual machine via a client tool executed on a client machine. The client tool determines that the client machine does not include a key associated with the user that allows the user to interact with the virtual machine, generates a public/private key pair for the user, and requests metadata associated with the virtual machine from a management module. After receiving the metadata from the management module, the client tool updates the metadata to include the public key and provides the updated metadata to the management module. The management module provides the updated metadata to a metadata server that is associated with the virtual machine. The virtual machine can obtain the updated metadata from the metadata server. After the virtual machine has obtained the updated metadata, the client tool can establish a connection between the client machine and the virtual machine or otherwise exchange data with the virtual machine using the public key.

Figure 1:
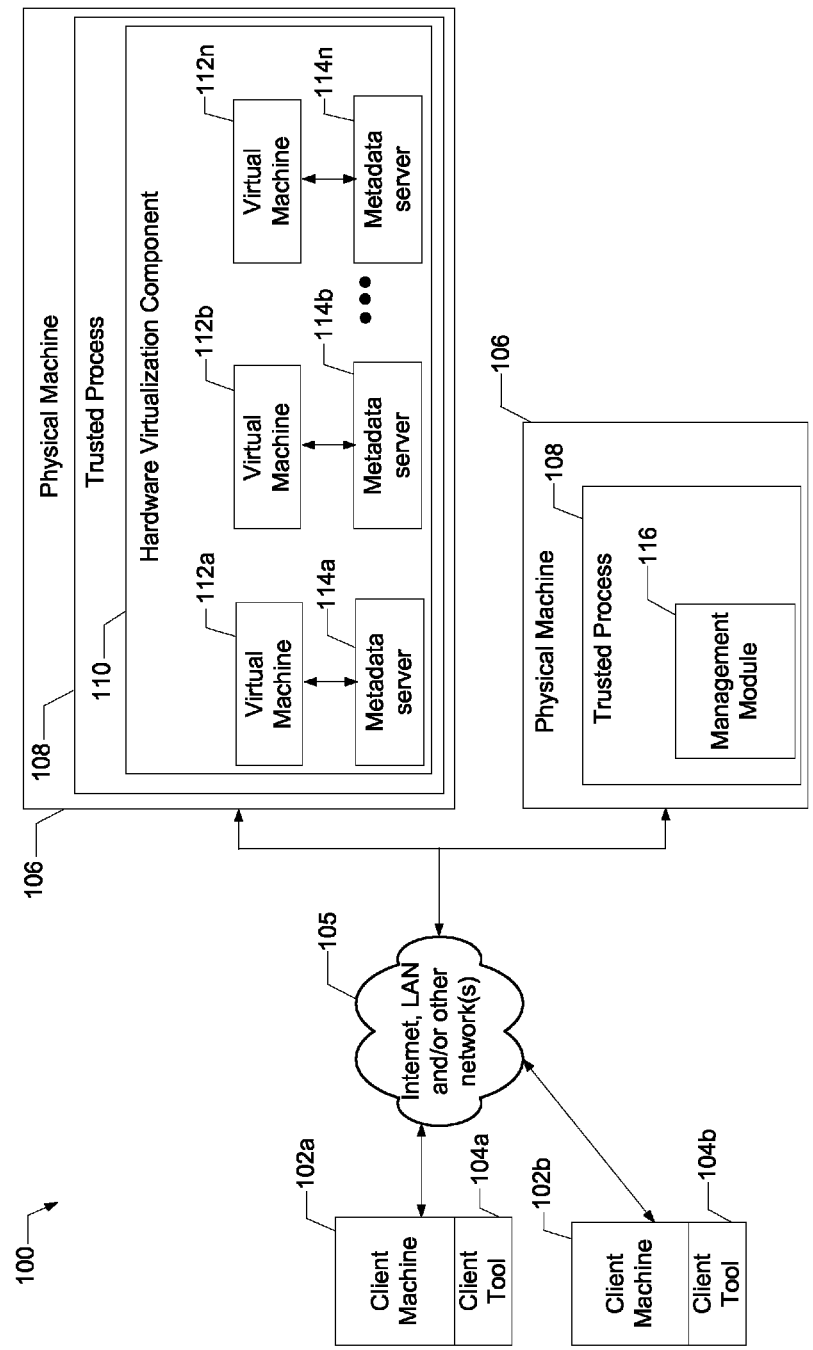
FIG. 1 is a block diagram of an example system that manages keys for virtual machines.

FIG. 1 is a block diagram of an example system 100 that manages keys for virtual machines. The system 100 includes client machines 102a, 102b, client tools 104a, 104b that are executed on the client machines 102a, 102b, respectively, and physical machines 106 that host virtual machines 112, metadata servers 114 and a management module 116. The client machines 102a, 102b and the physical machines 106 can communication through a network 105, for example, a local area network (LAN), wide area network (WAN), the Internet, or a combination thereof.

The client machines 102 can be any type of data processing apparatus. For example, the client machines 102a, 102b can be personal computers, laptops, workstations, servers, tablet computers, etc. The client machine 102a and the client machine 102b can be different types of data processing apparatuses. For example, the client machine 102a can be a laptop and the client machine 102b can be a server.

The client machines 102 can execute various applications and/or processes. For example, each client machine 102 can execute a client tool 104 (e.g., the client machine 102a can execute the client tool 104a and the client machine 102b can execute the client tool 104b). The client tool 104 can be an application or process that allows a user of the client machine 102 to connect to (e.g., log in) or interact with a virtual machine 112 through the network 105.

The client tool 104 can also determine whether the client machine 102 includes a key associated with the user of the client machine 102. For example, the client tool 104 can analyze a file that lists keys associated with the users of the client machine 102 and the virtual machines to which the keys correspond. The key can be a private key that is included in a Secure Shell ("SSH") key pair that includes the private key and a public key. The private key and public key are associated with the user and used to establish a connection or exchange data with one or more virtual machines. The private key is stored on the client machine 102 and, as explained below, the public key is stored on the client machine 102, the management module 116 and/or the metadata servers 114.

The client tool 104 can generate a key pair for each user of the client machine 102 that attempts to establish a connection to or exchange data with a virtual machine 112. For example, assuming that User A has not previously used the client machine 102a to connect to virtual machines 112a, 112b and assuming that User A has permission to interact with the virtual machines 112a, 112b, if User A attempts to connect to the virtual machine 112a, the client tool 104a can generate a key pair (e.g., a private and public key) associated with User A that will allow User A to interact with the virtual machines 112a, 112b. After the public key is provided to the virtual machines 112a, 112b, User A can then interact with the virtual machines 112a, 112b (e.g., exchange data with or connect to the virtual machine 112a). Similarly, assuming that User A has not previously used the client machine 102b to interact with the virtual machines 112a, 112b, if User A attempts to interact with either the first or second virtual machine from the client machine 102b, the client tool 104b creates a new key pair for User A, as explained in further detail below. The key pair generated by client tool 104b can be different than the key pair generated by the client tool 104a.

The physical machines 106 can be any type of data processing apparatus, such as a personal computer, a workstation, a server, etc. The physical machines 106 can be part of a collection of servers housed in a data center and can be configured to communicate with other physical machines 106, other servers and/or computing devices in the data center. The physical machines 106 can also be part of an internal network (e.g., an intranet). For example, the physical machines 106 can be connected to a company's internal network and communicate with other machines connected to the company's internal network. The physical machines 106 can also communicate with machines that are not part of a company's internal network using the network 105. For example, the physical machines 106 can communicate with the client machines 102a, 102b using the network 105. The physical machines 106 can be part of a cloud computing system and host one or more virtual machines 112, which host guest applications.

Each of the physical machines 106 can execute a trusted process 108. In general, a process is a trusted process 108 if it is initiated by an operator or administrator. The trusted process 108 can be a software process or an application that is initiated by an operator or administrator of the physical machines 106 and is executed by the physical machines 106 in a secure execution domain (e.g., an operating system running on the physical machines 106).

The trusted process 108 can be an application that can access resources and data that are not accessible by other processes. For example, the trusted process 108 can be a process that can access databases or other resources and provide the data stored in the databases to other applications or processes (e.g., a guest application).

The trusted process 108 can include a hardware virtualization component 110. The hardware virtualization component 110 can be used to implement virtual devices. For example, in some implementations, the hardware virtualization component 110 can include a virtualization component, e.g., a Kernel-based Virtualization Machine, and a processor emulator, e.g., QEMU, to virtualize and emulate hardware devices, e.g., a virtual machine 112 and a metadata server 114. In addition, other hardware devices (e.g., a network access interface, servers, etc.) and various device drivers can be virtualized.

The virtual machines 112 can be hardware virtualizations of data processing apparatus (e.g., of a computer or server). For example, each of the virtual machines 112a-n can be a virtualized computer that includes an operating system (e.g., a guest operating system) and one or more guest applications (not shown in FIG. 1). Although the virtual machines 112a-n of FIG. 1 are shown to be hosted on a single one of the physical machines 106, the virtual machines 112a-n can be hosted on multiple physical machines 106.

Each virtual machine 112 can be associated with a respective metadata server 114. For example, the virtual machine 112a is associated with the metadata server 114a. Each metadata server 114 stores metadata for its associated virtual machine 112. Each element of metadata that is stored in a metadata server 114 is a key-value pair. The key uniquely identifies a type of metadata. The value can be one or more pieces of data, for example, text strings. A virtual machine 112 can generally write arbitrary key-value pairs to its associated metadata server, although some special key names may be reserved or require specially formatted data. The system 100 can define default values for some virtual machine metadata. The default values can be overwritten by the virtual machine 112 and/or the management module 116. Some metadata key-value pairs are read-only, which prevents subsequent overwrites. The metadata that is stored in a metadata server 114 can include any attributes of its associated virtual machine 112. Some examples of common virtual machine metadata include a list of ephemeral and persistent disks associated with the virtual machine, a virtual machine description, a host machine domain, a geographic location of the virtual machine, a virtual machine configuration image name, a virtual machine identifier, a virtual machine type, a host machine type, a user identifier, tags associated with the virtual machine, and keys for communicating with the virtual machine.

One or more virtual machines 112 can be associated with a project. The term "project," as used herein encompasses its plain and ordinary meaning, including, but not limited to, is a collection of electronic and/or digital resources associated with an entity or organization, e.g., a collection of virtual disks, virtual networks, firewalls, and virtual machines 112 that are associated with an entity or organization. For example, the virtual machines 112a, 112b can be associated with a first project that is associated with a first entity ("Acme Corp") and the virtual machine 112n can be associated with a second project that is associated with a second entity ("Beta Corp"). End users associated with the first project, e.g., employees, contractors, or other users associated with Acme Corp that have been given permission to interact with the virtual machines 112a, 112b, can host various data and/or software applications, e.g., guest applications, on the virtual machines 112a, 112b. Similarly, end users associated with the second project, e.g., users associated with Beta Corp with permission to interact with the virtual machine 112n, can host various guest applications on the virtual machine 112n. The entity or organization can be a billable entity or billable organization, e.g., an entity that receives charges or bills associated with the project.

In the example above, the first and second projects are associated with different entities. However, in some examples, the first and second projects can be associated with the same entities but can include different users. For example, the first and second projects can be associated with Gamma Corp and a first set of users associated with Gamma Corp can be associated with the first project and a second set of users associated with Gamma Corp can be associated with the second project.

Each project is associated with a set of metadata. The set of metadata that is associated with a particular project can include various fields that store information or data associated with the project and/or resources associated with the project. For example, the set of metadata can include a field that includes a list of key-value pairs that represent public keys associated with the users (e.g., a key-value pair associated with User_A that allows User_A to use a particular client machine 102 to interact with virtual machines included in the project). The set of metadata that is associated with a particular project can be pushed or otherwise provided by the management module 116 to each of the metadata servers associated with virtual machines that are associated with the project at periodic intervals or after each update of the metadata, for example, to include a new key-value pair. In an example in which the virtual machine 112b is associated with a project ("Project 1"), metadata for Project 1 can be provided by the management module 116 to the metadata server 114b that is associated with the virtual machine 112b for storage. In some instances, the metadata specifically related to the virtual machine 112b can overwrite or take precedence over the metadata related to Project 1. In some implementations, instead of each virtual machine having being associated with a corresponding metadata server, two or more virtual machines 112 can share a metadata server 114.

In addition, each metadata server 114 is configured to receive and respond to requests for metadata from its associated virtual machine 112 but cannot receive or respond to requests for metadata from a virtual machine 112 other than the associated virtual machine 112. For example, the metadata server 112a can receive and respond to requests for metadata from its associated virtual machine 112a but cannot receive or respond to requests for metadata from the virtual machine 112b or the virtual machine 112n.

The management module 116 can be hosted on a physical machine 106 that does not host a virtual machine 112, which can lead to increased data security. In some implementations, the management module 116 can be hosted on a physical machine that hosts a virtual machine 112.

The management module 116 can exchange data with the client tools 104a, 104b. In one example, the client tool 104a provides the management module 116 with the public key associated with a particular user, e.g., User_A. The management module 116 updates metadata associated with Project 1 to include the public key received from the client tool 104. In another example, the client tool 104 receives metadata associated with a project from the management module 116 and returns, to the management module 116, updated metadata that includes the public key associated with a particular user, e.g., User_A.

The management module 116 provides the updated metadata to the metadata server 114 associated with the virtual machine 112. For example, the management module 116 can provide the updated metadata or the new metadata to the metadata server 114b, i.e., the metadata server that is associated with the virtual machine 112b. The metadata server 114b can provide the metadata to the virtual machine 112b, e.g., the entire set of metadata including metadata that has not been updated, or provide the updated metadata to the virtual machine 112b, e.g., the new key-value pair. The management module 116 can also provide the updated metadata or the new metadata to each metadata server 114 corresponding to a virtual machine 112 included in a project. For example, if virtual machines 112a, 112b are included in Project 1, then the management module 116 can provide the updated metadata or the new metadata to metadata servers 114a and 114b.

Figure 2A:
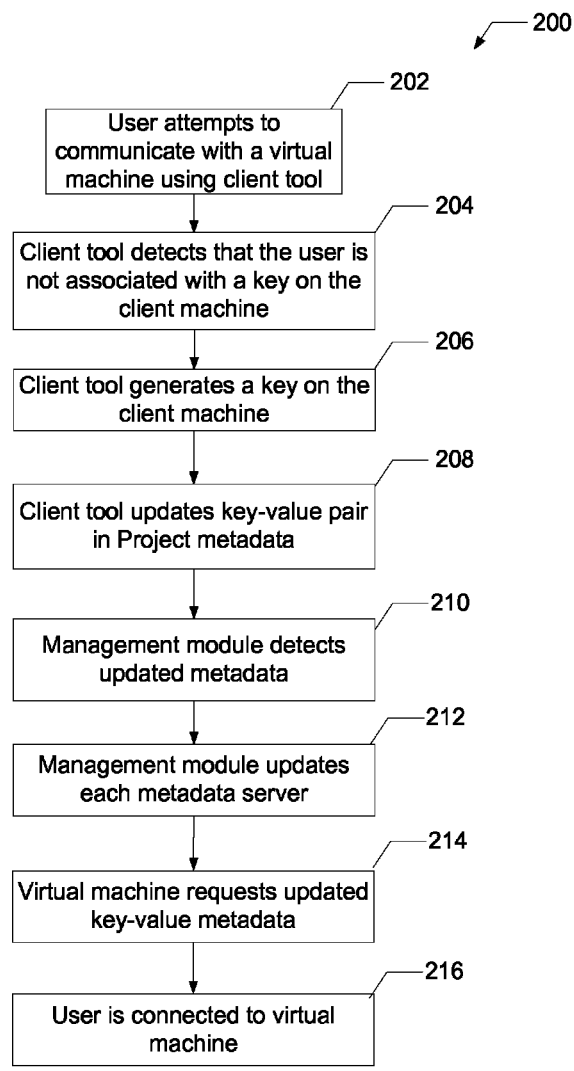
FIGS. 2A and 2B are flowcharts of example processes for managing keys for virtual machines.

FIG. 2A is a flowchart of an example process 200 for managing keys for virtual machines. Process 200 begins when a user of a client machine attempts to communicate with a virtual machine (at 202). For example, the user of a client machine 102a ("User_A") can use the client tool 104a to interact with the virtual machine 112a, e.g., establish a connection to the virtual machine 112a or otherwise exchange data with the virtual machine 112a. It is assumed that User_A and the virtual machine 112a are associated with a project ("Project 1"). For example, Project 1 can be associated with Acme Corp, and User_A can be an employee of Acme Corp that has permission to interact with the virtual machine 112a and the other virtual machines associated with Project 1.

The client tool can determine that the client machine does not include a key associated with the user that allows the user to interact with the virtual machine (at 204). For example, the client tool 104a can analyze a list of keys stored by the client machine 102a to determine whether the client machine 102a includes a private key associated with User_A that will allow User_A to interact with the virtual machine 112a. The client tool 104a determines that the client machine 102a does not include the private key associated with User_A if the User_A has not previously established a connection or exchanged data with the virtual machine 112a from the client machine 102a. Although not shown in FIG. 2A, if the client tool 104a determines that the client machine includes a key associated User_A, the client tool 104a can establish the connection with the virtual machine 112a or otherwise exchange data with the virtual machine 112a.

After determining that the client machine does not include a key associated with the user, the client tool can generate a key on the client machine (at 206). For example, the client tool 104a can generate a SSH key pair (e.g., a private key and a public key) associated with User_A. The private key is stored on the client machine 102a.

The client tool can update the metadata associated with the project (at 208). For example, the client tool 104a can request that the management module 116 provide the client tool 104a with metadata associated with Project 1. The metadata can include key-value pairs associated with the virtual machines included in Project 1 and other metadata associated with other project resources. The client tool 104a can update the metadata to include the public key associated with User_A. The client tool 104a can provide the updated metadata to the management module 116.

The management module can detect the updated metadata associated with the project (at 210). For example, the management module 116 can receive the metadata from the client tool 104a and compare the received metadata to the stored metadata associated with Project 1 to determine if there are differences between the two sets of metadata.

If the management module determines that the metadata has been updated, then the management module can update the metadata servers to include the updated or new metadata (at 212). For example, the management module 116 can update each of the metadata servers 114 associated with virtual machines 112 that are included in Project 1 (e.g., the metadata servers 114a) to include the key-value pair associated with User_A.

The virtual machine requests metadata from the metadata server (at 214). For example, the virtual machine 112a can request metadata from its associated metadata server 114a. The virtual machine 112a can be configured to poll the metadata server 114a for metadata at a predetermined rate. For example, the virtual machine 112a can request metadata every thirty seconds. Other polling frequencies can be used. In some implementations, the virtual machine 112a can receive the metadata from the metadata server 114a without polling the metadata server 114a. For example, the metadata server 114a can push the received metadata to the virtual machine 112a without first receiving a request from the virtual machine 112a. The metadata server 114a can provide the virtual machine 112a with the updated metadata (e.g., the new key-value pair). In addition, the metadata server 114a can provide the virtual machine 112a with all of the metadata it has stored and does not only provide the virtual machine 112a with the updated metadata. In these implementations, the virtual machine 112a can either 1) compare the received metadata with the metadata previously received to determine if there received metadata includes new metadata or 2) simply overwrite the previously received metadata with the newly received metadata.

After the virtual machine receives the updated metadata, data is exchanged with the client tool (at 216). For example, after the virtual machine 112a receives the updated metadata associated with Project 1, which includes the public key associated with User_A, the virtual machine 112a establishes a connection with the client tool 104a and exchanges data using the private key generated above. The connection can be established as a result of the client tool 104a attempting to connect to the virtual machine 112a using the generated key. The client tool 104a can attempt to connect to or interact with the virtual machine 112a a predetermined amount of time after the key pair is generated (e.g., at 206). For example, the client tool 104a can transmit the request ten seconds or thirty seconds after the key pair is generated.

A process similar to process 200 will be performed each time User_A attempts to exchange data with or establish a connection with a virtual machine 112 included in Project 1 from a client machine 102 that does not include a private key associated with User_A. For example, assuming that User_A has not previously interacted with virtual machine 112b from the client machine 102b, if User_A attempts to exchange data or establish a connection with the virtual machine 112a from the client machine 102b, the process 200 will be performed.

Figure 2B:
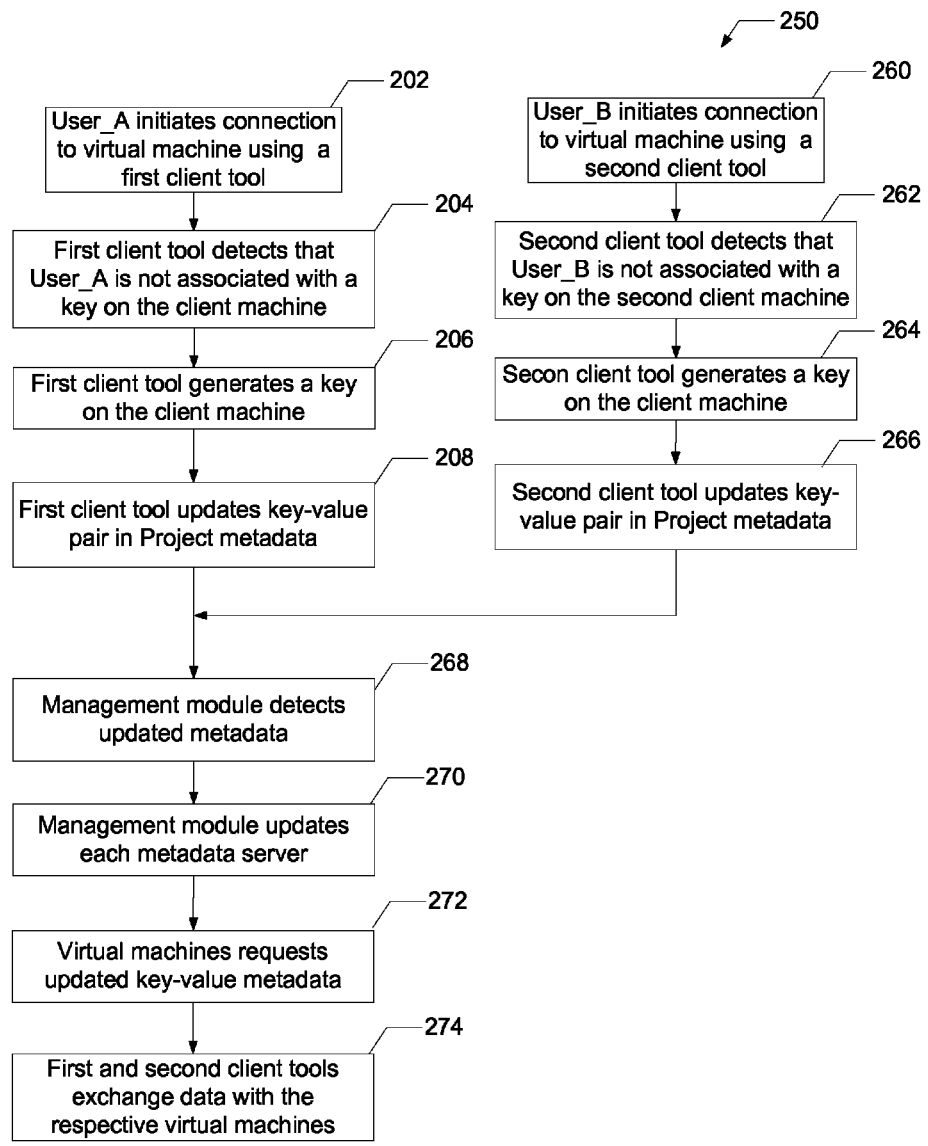

FIG. 2B is a flowchart of an example process 250 for managing keys for virtual machines. Similar to process 200, User_A using the client tool 104a on the client machine 102a attempts to exchange data or establish a connection to the virtual machine 112a (at 202). The client tool 104a detects that the client machine 102a does not include a private key associated with User_A that allows for User_A to interact with the virtual machine 112a (at 204). The client tool 104a generates a SSH key pair associated with the User_A (at 206) and updates the metadata stored by the management module 116 to include the new key-value pair associated with User_A (at 208).

A second user attempts to communicate with a second virtual machine (at 260). For example, the user of a second client machine 102b ("User_B") can use the client tool 104b to communicate with the virtual machine 112b. User_B can attempt to establish a connection to the virtual machine 112b or otherwise exchange data with the virtual machine 112b. It is assumed that the User_B and User_A are associated with Project 1 and have been granted permission or rights to access the virtual machines 112a and 112, which are included in Project 1.

The client tool can determine that the client machine does not include a key associated with the user (at 262). For example, the client tool 104b can analyze a list of keys stored by the client machine 102b to determine whether the client machine 102b includes a private key associated with User_B that allows User_B to interact with the virtual machine 112b. The client machine 102b will not include the private key associated with User_B if User_B has not previously established a connection or exchanged data with the virtual machine 112b from the client machine 102b.

The client tool can generate a key on the client machine (at 264). For example, the client tool 104b can generate a SSH key pair (e.g., a private key and a public key) associated with User_B. The private key is stored on the client machine 102b. The private key associated with User_B and stored on the client machine 102b is different than the private key associated with User_A and stored on client machine 102a.

The client tool can update the metadata associated with the project to include the new key data (at 266). For example, the client tool 104b can request that the management module 116 provide the client tool 104b with metadata associated with Project 1. The metadata can include key-value pairs associated with the virtual machines included in Project 1 (e.g., virtual machines 112a and 112b) and other metadata associated with other project resources. The client tool 104b can update the metadata to include the public key associated with User_B. The client tool 104b provides the updated metadata to the management module 116.

The management module can detect the updated metadata associated with Project 1 (at 268). For example, the management module 116 can receive the metadata from the client tool 104a and the client tool 104b and compare the received metadata (e.g., the updated metadata from the client tool 104a and the updated metadata from the client tool 104b) to the stored metadata and determine if there are differences between the received metadata and the stored metadata.

If the management module determines that the metadata has been updated, then the management module can update the metadata servers (at 270). For example, the management module 116 can update the metadata server 114a, 114b, which correspond to the virtual machines 112a, 112b, respectively, to include the updated metadata associated with User_A, which was provided by the client machine 102a, and the updated metadata associated with User_B, which was provided by the client machine 102b.

The virtual machines request metadata from the metadata servers (at 272). For example, the virtual machine 112a can request updated metadata from the metadata server 114a, and the virtual machine 112b can request metadata from the metadata server 114b. The virtual machines 112a, 112b can be configured to poll the metadata servers 114a, 114b for updated metadata at a predetermined rate. Each virtual machine 112a, 112b can poll the corresponding metadata server 114a, 114b at different rates. For example, the virtual machine 112a can request metadata every thirty seconds and the virtual machine 112b can request metadata every forty five seconds. Other polling frequencies can be used.

After the virtual machines receive the updated metadata, data is exchanged with the client tools (at 274). For example, after the virtual machine 112a receives the public key associated with User_A, which is included in the updated metadata, the virtual machine 112a establishes a connection with the client tool 104a and exchanges data with the client tool 104a using the private key. Similarly, after the virtual machine 112b receives the public key associated with User_B the virtual machine 112b establishes a connection with the client tool 104b and exchanges data with the client tool 104b using the private key. The connection can be established as a result of requests to connect to the virtual machines 112a, 112b that are transmitted by the client tools 104a, 104b. The client tools 104a, 104b can transmit the requests a predetermined amount of time after the public-private key pairs are generated (e.g., at 206 and at 264). For example, the client tool 104a can transmit the request ten seconds or thirty seconds after the key pair is generated.

Figure 3:
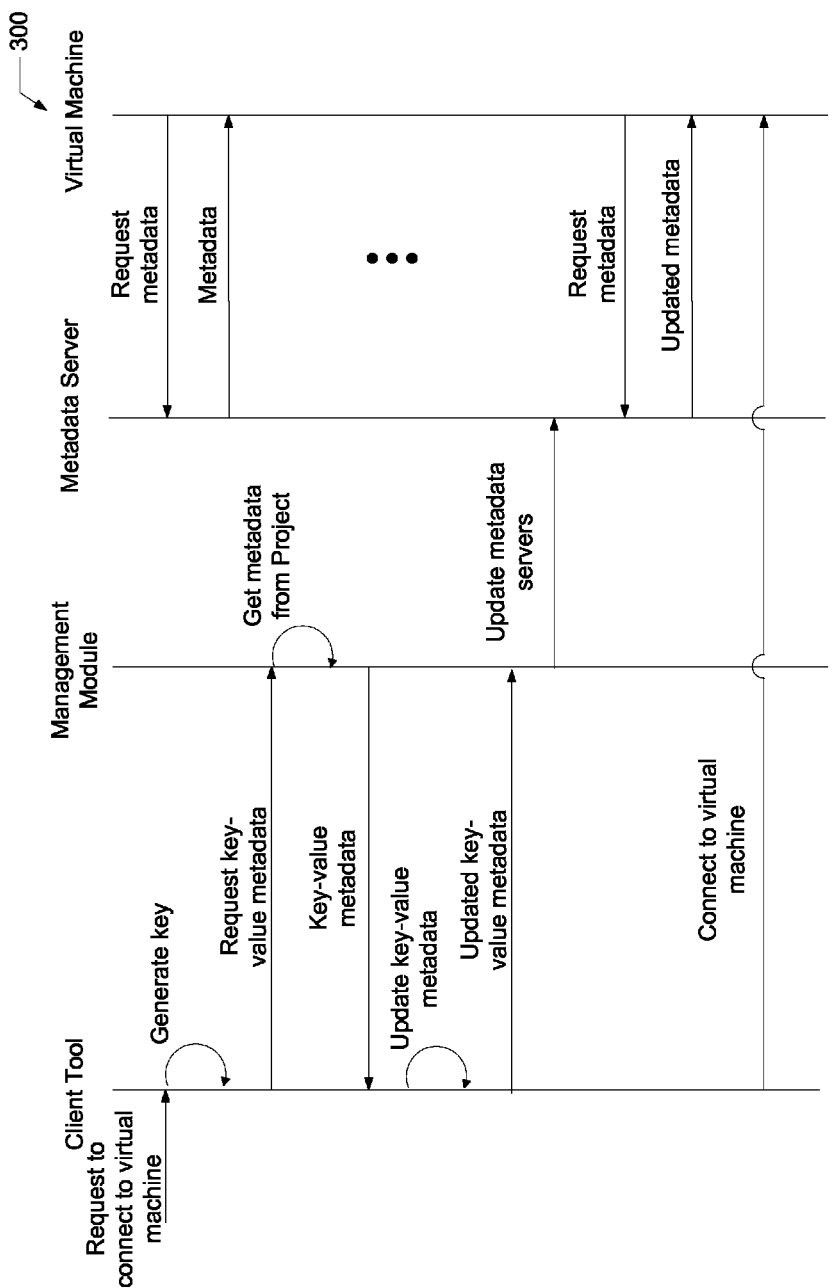
FIG. 3 is an illustration of an example data exchange between a client machine and the physical machines.

FIG. 3 is an illustration of an example data exchange 300 between a client machine and the physical machines, which include the management module 116, the virtual machines 112 and the corresponding metadata servers 114. The data can be exchanged between the client machine 102 and the physical machines 106 via the network 105.

The client tool 104 receives a request to connect to a virtual machine 112. For example, a user of the client machine 102a ("User_A") interacts with a client tool 104a to exchange data or establish a connection with the virtual machine 112a.

The client tool 104 generates a key. For example, assuming that User_A has not previously exchanged data or established a connection to the virtual machine 112a from the client machine 102a, the client tool 104a determines that the client machine 102a does not include a key associated with User_A and generates a SSH key-pair (e.g., a private key and public key associated with User_A that allows User_A to interact with the virtual machine 112a).

The client tool 104 requests metadata associated with the project, which the User_A and the virtual machine 112a are associated with, from the management module 116. For example, the client tool 104a can request metadata that includes key-value pairs associated with the project.

In response to the request for metadata, the management module 116 accesses the stored metadata associated with the project and provides the stored metadata to the client tool 104. For example, the management module 116 can provide the client tool 104a with the stored metadata that includes the key-value pairs associated with the project and the users associated with the project.

The client tool 104 receives the stored metadata and updates the metadata to include the newly generated key. For example, the client tool 104a updates the metadata to include a new key-value pair associated with User_A.

The client tool 104 provides the updated metadata to the management module 116. For example, the client tool 104a provides the updated metadata, which includes the new key-value pair, to the management module 116.

The management module 116 can detect that the metadata associated with the project has been updated and can provide the updated or new metadata to the metadata servers associated with the project. For example, after the management module 116 receives the metadata from the client tool 104a, the management module 116 can compare the received metadata to the stored metadata and identify the updated or new metadata (e.g., the new key-value pair). The management module 116 can provide the updated or new metadata to the metadata server 114a, which corresponds to the virtual machine 112a and other metadata servers associated with the project.

The virtual machine 112 can periodically request metadata from the corresponding metadata server 114. For example, the virtual machine 112a can periodically request metadata from the metadata server 114a (e.g., periodically poll the metadata server 114a for metadata every thirty seconds).

In response to the request from the virtual machine 112, the metadata server provides the virtual machine 112 with metadata associated with the project and/or metadata specifically associated with the virtual machine 112. For example, the metadata server 114a can provide the virtual machine 112a with the metadata stored on the metadata server 114a or provide the virtual machine 112a with the updated or new key-value data associated with User_A.

The client tool 104 can attempt to connect or exchange data with the virtual machine 112 and the virtual machine 112a can accept the connection or exchange data with the client tool 104. For example, the client tool 104a can attempt to connect or exchange data with the virtual machine 112a after waiting a predetermined amount of time after generating the SSH key-pair (e.g., 10 seconds after generating the SSH key-pair). Because the virtual machine 112a has received the updated metadata that includes the public key associated with User_A, the virtual machine 112a can exchange data and/or establish a connection with the client tool 104a. The public key is included in the updated metadata as a key-value pair.

Figure 4:
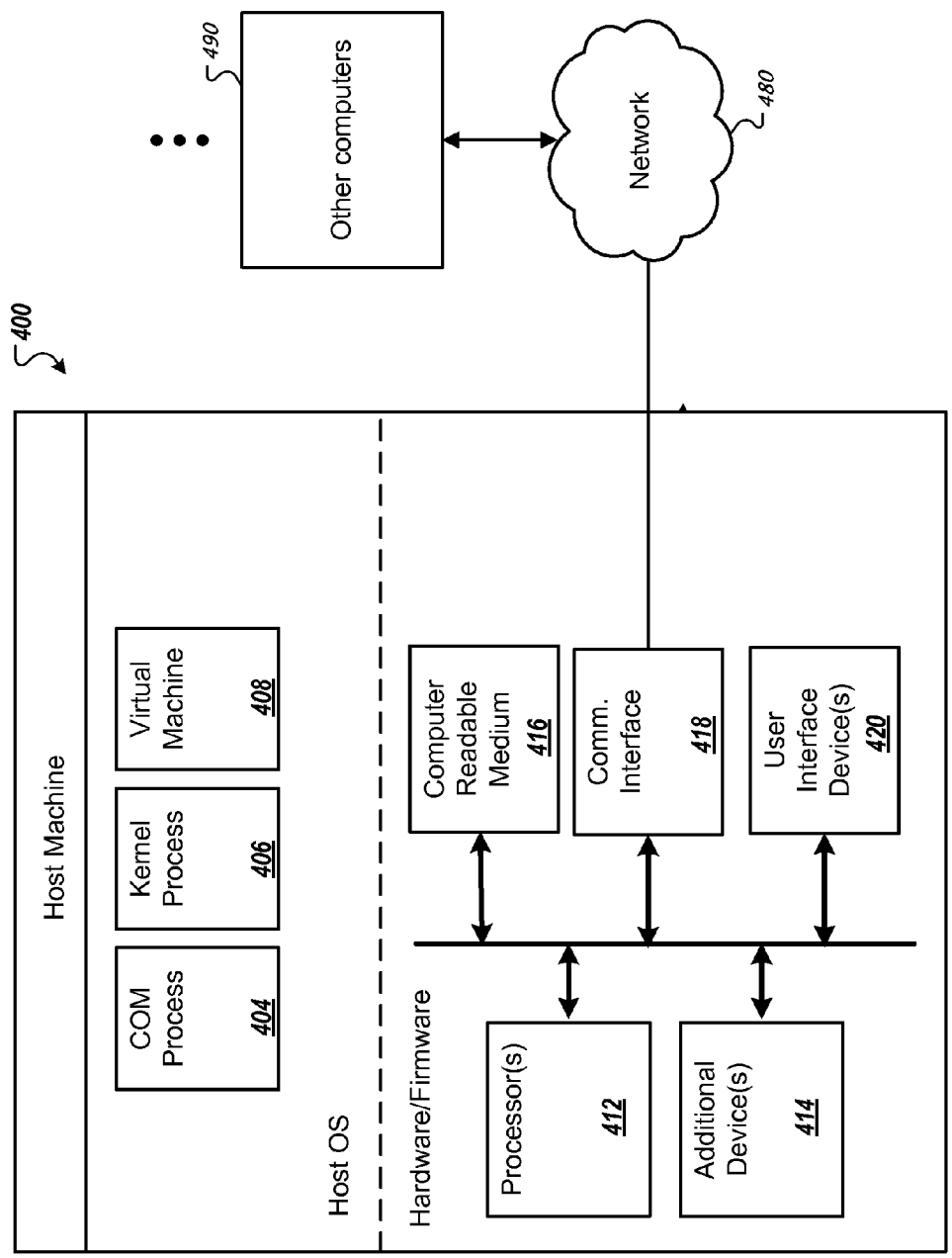
FIG. 4 is a block diagram of an example host machine.

FIG. 4 is a schematic diagram of an example data processing apparatus 400. The data processing apparatus 400 can optionally communicate with one or more other computers 490 through a network 480. While only one data processing apparatus 400 is shown in FIG. 4, multiple data processing apparatus can be used in one or more locations. The data processing apparatus 400 includes various modules, e.g. executable software programs. One of the modules is the kernel 406 of a host operating system (e.g., trusted process 108). A communication process module 404 is configured to establish VPNs, encapsulate packets and to de-encapsulate packets. A hardware virtualization component (e.g., hardware virtualization component 110) includes virtual hardware 408 (e.g., virtual machine 112a, 112b) that includes a guest operating system (e.g., guest OS), and guest applications (e.g., guest application). Although several software modules are illustrated, there may be fewer or more software modules. Moreover, the software modules can be distributed on one or more data processing apparatus connected by one or more networks or other suitable communication mediums.

The data processing apparatus 400 also includes hardware or firmware devices including one or more processors 412, one or more additional devices 414, a computer readable medium 416, a communication interface 418, and optionally one or more user interface devices 420. Each processor 412 is capable of processing instructions for execution within the data processing apparatus 402. In some implementations, the processor 412 is a single or multi-threaded processor. Each processor 412 is capable of processing instructions stored on the computer readable medium 416 or on a storage device such as one of the additional devices 414. The data processing apparatus 400 uses its communication interface 418 to communicate with one or more computers 490, for example, over a network 480. Examples of user interface devices 420 include a display, a camera, a speaker, a microphone, a tactile feedback device, a keyboard, and a mouse. The data processing apparatus 400 can store instructions that implement operations associated with the modules described above, for example, on the computer readable medium 416 or one or more additional devices 414, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

receiving a request for key-value metadata associated with a project at a first server, the first server implementing a management module, from a first client machine in response to a determination, by the first client machine, that a first user has not used the first client machine to connect or exchange data with a first virtual machine;

sending, by the first server, key-value metadata to the first client machine, the key-value metadata including key-value information associated with the project and key-value information of a group of users associated with the project;

receiving updated key-value metadata from the first client machine at the first server, the updated key-value metadata including a first public key associated with the first user from the first client machine, wherein the first public key and a first private key were generated on the first client machine by a first client tool at the first client machine in response to the determination that the first user has not used the first client machine to connect or exchange data with a first virtual machine, the updated key-value metadata updating the group of users associated with the project by including the key-value information of the first user using the first client machine;

receiving a request for key-value metadata associated with the project at the first server from a second client machine in response to a determination, by the second client machine, that a second user has not used the second client machine to connect or exchange data with a second virtual machine, wherein the project includes at least the first virtual machine and the second virtual machine;

sending, by the first server, key-value metadata to the second client machine, the key-value metadata including key-value information associated with the project and key-value information of the group of users associated with the project;

receiving updated key-value metadata from the second client machine at the first server, the updated key-value metadata including a second public key associated with the second user from the second client machine, wherein the second public key and a second private key were generated on the second client machine by a second client tool at the second client machine in response to the determination that the second user has not used the second client machine to connect or exchange data with a second virtual, the updated key-value metadata updating the group of users associated with the project by including the key-value information of the second user using the second client machine; and providing the updated key-value metadata to a plurality of metadata servers, the plurality of metadata servers including one or more second servers and including a first metadata server and a second metadata server, wherein a first metadata server is dedicated to the first virtual machine and configured to provide the updated key-value metadata to the first virtual machine in response to a request for updated key-value metadata from the first virtual machine and wherein a second metadata server is dedicated to the second virtual machine and configured to provide the updated key-value metadata to the second virtual machine in response to a request for updated key-value metadata from the second virtual machine.

2. The computer-implemented method of claim 1 further comprising:
receiving a third public key associated with the first user from the second client machine,
wherein the third public key and a third private key were generated on the second client machine in response to a determination that the second client machine lacked the third private key and in response to an attempt to communicate with the second virtual machine from the second client machine, and
updating key-value metadata associated with the project to include the third public key; and
providing the updated key-value metadata to the plurality of metadata servers including the first metadata server and the second metadata server, wherein the second client machine exchanges data with the second virtual machine after the second metadata server receives the updated key-value metadata.

3. The computer-implemented method of claim 1 wherein the first client machine establishes a connection to the first virtual machine after the first virtual machine updates the key-value metadata and wherein the second client machine establishes a connection to the second virtual machine after the second virtual machine updates the key-value metadata.

4. The computer-implemented method of claim 1 wherein the first public key and first private key are associated with a first secure shell key.

5. The computer-implemented method of claim 1 wherein the requests for updated key-value metadata comprises periodic requests for updated key-value metadata.

6. The computer-implemented method of claim 1 wherein the first metadata server is configured to provide updated key-value metadata to only the first virtual machine and wherein the second metadata server is configured to provide updated key-value metadata to only the second virtual machine.

7. The computer-implemented method of claim 1 wherein the project is associated with a billable entity, wherein the first and second users are associated with the billable entity.

8. The computer-implemented method of claim 1 wherein the first virtual machine and the second virtual machine are hosted on one or more physical machines different than a physical machine performing the computer-implemented method.

9. A system comprising:
memory storing instructions; and
one or more processors configured to execute the instructions that cause the one or more processors to perform operations comprising:
receiving a request for key-value metadata associated with a project at a first server, the first server implementing a management module, from a first client machine in response to a determination, by the first client machine, that a first user has not used the first client machine to connect or exchange data with a first virtual machine;
sending, by the first server, key-value metadata to the first client machine, the key-value metadata including key-value information associated with the project and key-value information of a group of users associated with the project;
receiving updated key-value metadata from the first client machine at the first server, the updated key-value metadata including a first public key associated with the first user from the first client machine, wherein the first public key and a first private key were generated on the first client machine by a first client tool at the first client machine in response to the determination that the first user has not used the first client machine to connect or exchange data with a first virtual machine, the updated key-value metadata updating the group of users associated with the project by including the key-value information of the first user using the first client machine;
receiving a request for key-value metadata associated with the project at the first server from a second client machine in response to a determination, by the second client machine, that a second user has not used the second client machine to connect or exchange data with a second virtual machine, wherein the project includes at least the first virtual machine and the second virtual machine;
sending, by the first server, key-value metadata to the second client machine, the key-value metadata including key-value information associated with the project and key-value information of the group of users associated with the project;
receiving updated key-value metadata from the second client machine at the first server, the updated key-value metadata including a second public key associated with the second user from the second client machine, wherein the second public key and a second private key were generated on the second client machine by a second client tool at the second client machine in response to the determination that the second user has not used the second client machine to connect or exchange data with a second virtual, the updated key-value metadata updating the group of users associated with the project by including the key-value information of the second user using the second client machine; and
providing the updated key-value metadata to a plurality of metadata servers, the plurality of metadata servers including one or more second servers and including a first metadata server and a second metadata server, wherein a first metadata server is dedicated to the first virtual machine and configured to provide the updated key-value metadata to the first virtual machine in response to a request for updated key-value metadata from the first virtual machine and wherein a second metadata server is dedicated to the second virtual machine and configured to provide the updated key-value metadata to the second virtual machine in response to a request for updated key-value metadata from the second virtual machine.

10. The system of claim 9 wherein the operations further comprise:
receiving a third public key associated with the first user from the second client machine, wherein the third public key and a third private key were generated on the second client machine in response to a determination that the second client machine lacked the third private key and in response to an attempt to communicate with the second virtual machine from the second client machine, and updating key-value metadata associated with the project to include the third public key; and providing the updated key-value metadata to the plurality of metadata servers including the first metadata server and the second metadata server, wherein the second client machine exchanges data with the second virtual machine after the second metadata server receives the updated key-value metadata.

11. The system of claim 9 wherein the first client machine establishes a connection to the first virtual machine after the first virtual machine updates the key-value metadata and wherein the second client machine establishes a connection to the second virtual machine after the second virtual machine updates the key-value metadata.

12. The system of claim 9 wherein the first public key and first private key are associated with a first secure shell key.

13. The system of claim 9 wherein the requests for updated key-value metadata comprises periodic requests for updated key-value metadata.

14. The system of claim 9 wherein the first metadata server is configured to provide updated key-value metadata to only the first virtual machine and wherein the second metadata server is configured to provide updated key-value metadata to only the second virtual machine.

15. The system of claim 9 wherein the first virtual machine and the second virtual machine are hosted one or more physical machines other than the system.

16. A non-transitory computer-readable medium storing instructions that upon execution by a processing device cause the processing device to perform operations, comprising:

receiving a request for key-value metadata associated with a project at a first server, the first server implementing a management module, from a first client machine in response to a determination, by the first client machine, that a first user has not used the first client machine to connect or exchange data with a first virtual machine;

sending, by the first server, key-value metadata to the first client machine, the key-value metadata including key-value information associated with the project and key-value information of a group of users associated with the project;

receiving updated key-value metadata from the first client machine at the first server, the updated key-value metadata including a first public key associated with the first user from the first client machine, wherein the first public key and a first private key were generated on the first client machine by a first client tool at the first client machine in response to the determination that the first user has not used the first client machine to connect or exchange data with a first virtual machine, the updated key-value metadata updating the group of users associated with the project by including the key-value information of the first user using the first client machine;

receiving a request for key-value metadata associated with the project at the first server from a second client machine in response to a determination, by the second client machine, that a second user has not used the second client machine to connect or exchange data with a second virtual machine, wherein the project includes at least the first virtual machine and the second virtual machine;

sending, by the first server, key-value metadata to the second client machine, the key-value metadata including key-value information associated with the project and key-value information of the group of users associated with the project;

receiving updated key-value metadata from the second client machine at the first server, the updated key-value metadata including a second public key associated with the second user from the second client machine, wherein the second public key and a second private key were generated on the second client machine by a second client tool at the second client machine in response to the determination that the second user has not used the second client machine to connect or exchange data with a second virtual, the updated key-value metadata updating the group of users associated with the project by including the key-value information of the second user using the second client machine; and providing the updated key-value metadata to a plurality of metadata servers, the plurality of metadata servers including one or more second servers and including a first metadata server and a second metadata server, wherein a first metadata server is dedicated to the first virtual machine and configured to provide the updated key-value metadata to the first virtual machine in response to a request for updated key-value metadata from the first virtual machine and wherein a second metadata server is dedicated to the second virtual machine and configured to provide the updated key-value metadata to the second virtual machine in response to a request for updated key-value metadata from the second virtual machine.

17. The computer-readable medium of claim 16 wherein the operations further comprise:

receiving a third public key associated with the first user from the second client machine,
wherein the third public key and a third private key were generated on the second client machine in response to a determination that the second client machine lacked the third private key and in response to an attempt to communicate with the second virtual machine from the second client machine, and updating key-value metadata associated with the project to include the third public key; and providing the updated key-value metadata to the plurality of metadata servers including the first metadata server and the second metadata server, wherein the second client machine exchanges data with the second virtual machine after the second metadata server receives the updated key-value metadata.

18. The computer-readable medium of claim 16 wherein the first client machine establishes a connection to the first virtual machine after the first virtual machine updates the key-value metadata and wherein the second client machine establishes a connection to the second virtual machine after the second virtual machine updates the key-value metadata.

19. The computer-readable medium of claim 16 wherein the first public key and first private key are associated with a first secure shell key.

20. The computer-readable medium of claim 16 wherein the requests for updated key-value metadata comprises periodic requests for updated key-value metadata.

21. The computer-readable medium of claim 16 wherein the first metadata server is configured to provide updated key-value metadata to only the first virtual machine and wherein the second metadata server is configured to provide updated key-value metadata to only the second virtual machine.

22. The computer-readable medium of claim 16 wherein the project is associated with a billable entity, wherein the first and second users are associated with the billable entity.

* * * * *